United States Patent
Joko et al.

Patent Number: 6,132,627
Date of Patent: *Oct. 17, 2000

[54] TREATMENT METHOD FOR WATER CONTAINING NITROGEN COMPOUNDS

[75] Inventors: Isao Joko; Satoshi Miwa, both of Kanagawa, Japan

[73] Assignee: Kurita Water Industries Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,818
[22] Filed: Dec. 17, 1997

[30] Foreign Application Priority Data

Dec. 18, 1996 [JP] Japan ................................ 8-354063

[51] Int. Cl.$^7$ ........................................................ C02F 1/76
[52] U.S. Cl. ........................ 210/748; 210/756; 210/763; 210/903
[58] Field of Search .................................... 210/756, 748, 210/903, 758, 763; 205/349, 500

[56] References Cited

U.S. PATENT DOCUMENTS

| | | | |
|---|---|---|---|
| 3,929,600 | 12/1975 | Hiasa et al. ............................... | 210/748 |
| 3,944,487 | 3/1976 | Davis et al. .............................. | 210/756 |
| 4,137,166 | 1/1979 | Heimberger et al. .................... | 210/756 |
| 4,307,067 | 12/1981 | Tagawa et al. .......................... | 423/224 |
| 4,879,047 | 11/1989 | Jackson .................................. | 210/756 |
| 5,772,897 | 6/1998 | Hancock ................................. | 210/756 |

FOREIGN PATENT DOCUMENTS

| | | | |
|---|---|---|---|
| 55-14720 | 4/1980 | Japan ..................................... | 210/748 |
| 58-112089 | 7/1983 | Japan . | |
| 59-000377 | 1/1984 | Japan . | |
| 2-2896 | 1/1990 | Japan ..................................... | 210/756 |

*Primary Examiner*—David A. Simmons
*Assistant Examiner*—Frank M. Lawrence
*Attorney, Agent, or Firm*—Morrison Law Firm

[57] ABSTRACT

Waste water containing nitrogen compounds is treated by first breaking the nitrogen compounds down by electrolysis in the presence of chlorine ions. The electrolysis step converts chlorine ions to hypochlorite ions. The partially treated water is returned to a storage container. The hypochlorite ions oxidize the nitrogen compounds and are reconverted to chlorine atoms. The partially treated water then may be returned to the electrolysis container to regenerate hypochlorite ions. In a second step, the partially treated waste water is passed over a metal peroxide catalyst. The metal peroxide catalyst further breaks down the nitrogen compounds, and removes the excess hypochlorite ions.

14 Claims, 1 Drawing Sheet

TREATMENT METHOD FOR WATER CONTAINING NITROGEN COMPOUNDS

BACKGROUND OF THE INVENTION

The present invention relates to a method for processing water which contains nitrogen compounds. More specifically, the present invention relates to a treatment method for water which contains nitrogen compounds, wherein water is processed at normal temperature and pressure. Nitrogen compounds are removed by oxidative breakdown into nitrogen gas. At the same time, chemical oxygen demand (COD) is also reduced.

Waste sources of nitrogen compounds include proteins, which are used in livestock feed production industries; nitric acid, which is used in inorganic pigment production; ammonia, nitric acid, sodium nitrate, and sodium nitrite, which are used in surface processing steps in metal products production industries and electronic machinery appliance manufacturing; and the like. When released into water, nitrogen compounds are responsible for overnitrification. If these nitrogen compounds are released as nitrogen oxides into the atmosphere, they are dangerous to health as primary pollutants. Furthermore, nitrogen oxides participate in a photochemical reaction and become one of the components of smog, a secondary combined pollution phenomenon. As a result, water which contains nitrogen compounds must be processed for denitrification. The dispersal of unprocessed nitrogen compounds into the atmosphere during these processing steps must be prevented.

Waste water which contains nitrogen compounds can also contain organic compounds other than nitrogen compounds. Furthermore, the nitrogen compound itself can be organic or can be oxygen consuming. As a result, the chemical oxygen demand (COD) of water containing nitrogen compounds can be great. In these cases, as nitrogen compounds are broken down, there is also a need to reduce the COD.

Methods such as the activated carbon adsorption method and biological processing methods are well-known as conventional processing methods for nitrogen compounds in waste water. However, when using the activated carbon adsorption method, it is necessary to reactivate the activated carbon when adsorption equilibrium is reached. With reactivation, a highly concentrated nitrogen compound-containing reactivation waste solution is generated. The need for further processing of this waste is an additional problem.

When water containing nitrogen is biologically processed, the breakdown time required is long because the reaction time is relatively slow. A large-volume biological reaction container becomes necessary, and there is an additional problem of a large amount of excess sludge being generated.

In Japanese Laid Open Patent Number 7-100466, a method is proposed wherein waste water containing ammonia is processed by electrolysis in the presence of chloride ions, at a pH between 8 and 12. The ammonium ion and COD components in the water are efficiently degraded and removed. However, this method generates hypochlorite ions as a by-product, which remain in the processed water and must be removed by further processing.

The present inventors have proposed a method for treating waste water which contains an alkanolamine. In this method, an oxidant is added to waste water which contains an alkanolamine. The alkanolamine is oxidized and broken down in the presence of a metal catalyst and heat. By this method, monoethanolamine and the like can be efficiently oxidized and broken down. However, it is desirable to improve this method by eliminating the need for added oxidants or the need to heat to temperatures greater than 100° C.

OBJECTS AND SUMMARY OF THE INVENTION

The object of the present invention is to provide a method for treating water containing nitrogen compounds which does not require added oxidants, and which can process water which contain nitrogen compounds at normal temperatures and pressure.

A further object is to provide a method for treating water which contains nitrogen compounds, wherein nitrogen compounds in the water are oxidized and broken down to nitrogen gas and removed, and the chemical oxygen demand (COD) is simultaneously reduced.

As a result of intensive research in order to achieve the above objects, it was found that nitrogen compounds are efficiently broken down and removed if, after electrolysis of the water which contains nitrogen compounds and inorganic chloride compounds, the waste water is brought into contact with a metal peroxide catalyst. By the method of the present invention, no residual chlorine is left in the processed water.

Briefly stated, waste water containing nitrogen compounds is treated by first breaking the nitrogen compounds down by electrolysis in the presence of chlorine ions. The electrolysis step converts chlorine ions to hypochlorite ions. The partially treated water is returned to a storage container. The hypochlorite ions oxidize the nitrogen compounds and are reconverted to chlorine atoms. The partially treated water then may be returned to the electrolysis container to regenerate hypochlorite ions. In a second step, the partially treated waste water is passed over a metal peroxide catalyst. The metal peroxide catalyst further breaks down the nitrogen compounds, and removes the excess hypochlorite ions.

According to an embodiment of the present invention, a method for treating waste water containing nitrogen compounds and chlorine ions comprises the steps of performing electrolysis on the waste water, such that the chlorine ions are oxidized to hypochlorite ions, and the nitrogen compounds are oxidized by the hypochlorite ions and thereby broken down, and contacting the waste water with a metal peroxide catalyst after the step of performing electrolysis, such that hypochlorite ions are removed from the waste water.

According to another embodiment of the present invention, a method for treating waste water containing nitrogen compounds comprises the steps of circulating the waste water between a storage container and an electrolysis container, adding inorganic chlorides to a substoichiometric quantity, performing electrolysis in the electrolysis chamber, such that the chlorine ions are oxidized to hypochlorite ions, and the nitrogen compounds are oxidized by the hypochlorite ions and thereby broken down, and contacting the waste water with a metal peroxide catalyst after the step of performing electrolysis, such that the hypochlorite ions formed during the electrolysis are removed from the waste water, the metal peroxide catalyst containing one of cobalt peroxide and nickel peroxide, the metal peroxide catalyst further containing at least one member from the group consisting of zeolite, titania, γ-alumina, and α-alumina, the one of cobalt peroxide and nickel peroxide being present in the metal peroxide catalyst at a concentration of between about 0.01% by weight and 10% by weight, the step of contacting occurring at an SV between about 0.1 $hr^{-1}$ and about 60 $hr^{-1}$, a temperature between about 20° C. and about 80° C., and a pressure substantially equal to atmospheric pressure.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
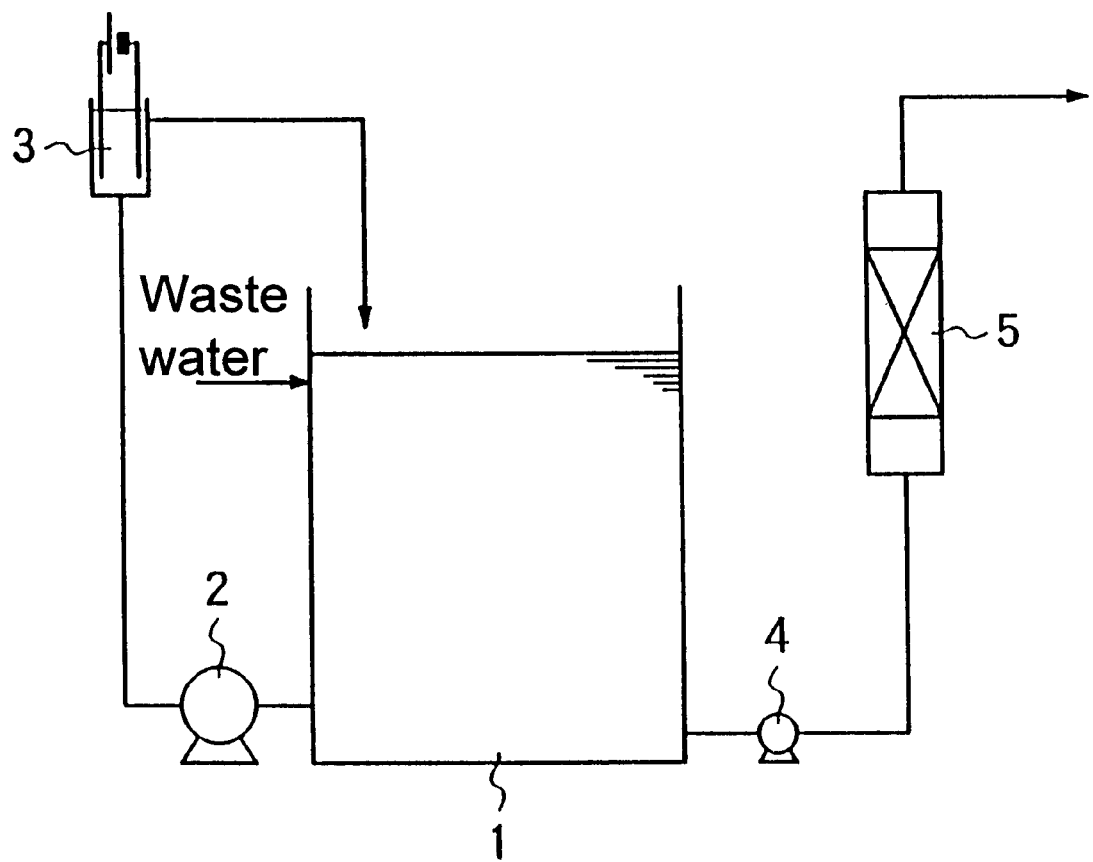
FIG. 1 is a flow diagram illustrating the steps of the present invention.

In the method of the present invention, after waste water which contains nitrogen compounds and inorganic chlorides is first treated by electrolysis, the waste water is brought into contact with a metal oxide catalyst.

Examples of nitrogen compounds which can be processed by the method of the present invention include inorganic nitrogen compounds, such as ammonia, hydrazine, 1,3-dimethyl-2-imidazolidinone, and the like; and organic nitrogen compounds, such as urea, ethanolamine, aniline, and the like. Waste water which contains such nitrogen compounds are typically discharged from, for example, dye factories, fertilizer factories, semiconductor factories, electric power plants, and chemical or pharmaceutical manufacturing factories.

In the present invention, it is preferable that the electrodes used in electrolysis be of an electrode material which does not dissolve into water. Examples include platinum-plated titanium electrodes, titanium electrodes which are coated with iridium or palladium, lead dioxide electrodes, and ferrite electrodes.

In the present invention, inorganic chlorides which are dissolved in the waste water generate chlorine ions. As a result of the electrolysis reaction, chlorine ions are oxidized to hypochlorite ions, as indicated in the following equation:

$Cl^- + 2OH^- \rightarrow ClO^- + H_2O + 2e^-$

Hypochlorite ions react with a wide variety of nitrogen compounds. A number of these reactions are set forth below.

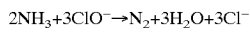
$2NH_3 + 3ClO^- \rightarrow N_2 + 3H_2O + 3Cl^-$

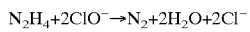
$N_2H_4 + 2ClO^- \rightarrow N_2 + 2H_2O + 2Cl^-$

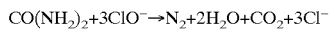
$CO(NH_2)_2 + 3ClO^- \rightarrow N_2 + 2H_2O + CO_2 + 3Cl^-$

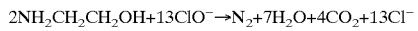
$2NH_2CH_2CH_2OH + 13ClO^- \rightarrow N_2 + 7H_2O + 4CO_2 + 13Cl^-$

$2C_6H_5NH_2 + 31ClO^- \rightarrow N_2 + 7H_2O + 12CO_2 + 31Cl^-$

If the nitrogen compound is an organic compound, nitrogen is converted into harmless nitrogen gas, and carbon is converted to carbon dioxide gas. As a result, the total organic carbon amount and the chemical oxygen demand of the processed water is reduced.

In the method of the present invention, chlorine ions, which are generated by inorganic chlorides dissolving in water, are oxidized to hypochlorite ions through electrolysis. Hypochlorite ions oxidize nitrogen compounds, and chlorine ions are regenerated. These chlorine ions again are oxidized to hypochliorite ions through electrolysis. A single chlorine ion alternates between chlorine ion and hypochlorite ion, and thus contributes to several cycles of the reaction. As a result, the amount of inorganic chloride required for treatment of the nitrogen compounds is less than the stoichiometric values indicated by the above equations.

If the waste water contains nitrogen compounds and sufficient levels of waste inorganic chloride compounds, it is possible to process by electrolysis directly. However, if the waste water does not already contain an adequate amount of inorganic chlorides, inorganic chlorides must be added before conducting electrolysis. There are no particular limitations to the inorganic chloride which is to be added so long as the inorganic chloride is water soluble. Examples include lithium chloride, sodium chloride, potassium chloride, beryllium chloride, magnesium chloride, and calcium chloride.

Electrolysis is conducted while circulating the water which contains nitrogen compounds and inorganic chlorides between a storage container and an electrolysis container. A portion of the water in the storage container is removed and is passed through a column filled with a metal peroxide catalyst to obtain the final form of the processed water. In this processing, an optimal amount of inorganic chloride can be maintained by controlling the speed with which the water circulates to the electrolysis reaction container, the speed of the water passage through the catalyst column, and the like.

In the method of the present invention, a portion of the nitrogen compounds is broken down by hypochlorite ions generated by electrolysis before contacting the metal peroxide catalyst. Thereafter, water containing the remaining nitrogen compounds and hypochlorite ions generated by electrolysis is brought into contact with the catalyst. Not only are the remaining nitrogen compounds broken down at this step, but excess hypochlorite ions are removed as well. When the water which contains nitrogen compounds and hypochlorite ions comes into contact with the metal peroxide catalyst, the breakdown reactions of the nitrogen compounds proceed rapidly at normal temperature and pressure.

Examples of metal peroxide catalysts useful in the present invention include cobalt peroxide, nickel peroxide, copper peroxide, and silver peroxide. Among these, cobalt peroxide and nickel peroxide are preferred. It is preferable that these metal peroxide catalysts be carried on zeolite, titania, γ-alumina, α-alumina or the like. The preparation method for these are described below, using the example of zeolite as the carrier and cobalt peroxide as the carried catalyst.

Zeolite is an aluminosilicate which has uniform fine pores of molecular size. The structure of zeolite is a series of tetrahedrons of silicon atoms, with a portion substituted by aluminum atoms, which form a three dimensional mesh structure via oxygen atoms. Characteristic hollows and channels are formed. The size of these hollows or channels are determined by the size of the oxygen ring. Zeolite typically has an ability to replace cations. In the present invention, natural zeolites, such as clinoptiololite or mordenite, or synthetic zeolites, such as zeolite A, zeolite X, or zeolite Y can be used with good results. These zeolites can be used singly, or two or more types can be mixed and used.

The processing of the zeolite carrier is conducted by bringing it into contact with aqueous solutions of sulfates, nitrates, or chlorides of cobalt, or mixture solutions of these. One method of contact involves soaking particles of zeolite in the solution. Alternatively, zeolite particles can be packed into a column and the aqueous solution can be passed through once or in a circulating manner. The concentration of cobalt salt and contact times are determined so that the necessary amount of cobalt is retained by the zeolite. The amount of cobalt which is carried is preferably between about 0.01% and about 10% by weight. The thus-processed zeolite is then rinsed with water as needed after being separated from the aqueous solution. A rinsing step is desirable to remove all cobalt ions not present in the active sites of zeolite. Generally, it is preferable to rinse until the color of cobalt ions disappear from the rinse water. By this procedure, it is possible to obtain an effective zeolite carrier bearing a small amount of cobalt.

Next, the zeolite carrier obtained as above is brought into contact with an alkaline aqueous solution which contains chlorine agents. As a method of contact, zeolite can be soaked in an alkaline solution which contains chlorine agents. Alternatively, zeolite can be packed into a column, and the alkaline solution containing chlorine agents can be passed through once or in a circulating manner. In this manner, the cobalt peroxide catalyst used in the present invention is obtained. At the time of contact, a small amount of cobalt ions may separate from zeolite and generate fine precipitate in the peroxide, but the precipitate can be removed through final rinsing. Examples of chlorine agents include chemicals which generate free chlorine such as sodium hypochlorite, chlorine gas, chlorine generated by electrolysis, and the like. Examples of the alkaline aqueous solution which is used in conjunction with the chlorine agent include aqueous solutions of sodium hydroxide, potassium hydroxide, and the like.

As an alternative method of formation of the cobalt peroxide catalyst, the zeolite may be heated after the rinsing step, causing the cobalt ion to change to cobalt oxide. Next, the zeolite carrier is brought into contact with an alkaline solution, and the same catalyst is obtained.

By the present invention, a portion of nitrogen compounds are oxidized and broken down by hypochlorite ions which are generated by electrolysis. Furthermore, the water which contains remaining nitrogen compounds and hypochlorite ions is brought into contact with a metal peroxide catalyst which is prepared as described above. This results in total breakdown of nitrogen compounds. The oxidation reaction regenerates chlorine ions, which are reoxidized by electrolysis to hypochlorite ions.

The catalyst, packed as particles of diameter about 0.3 to about 10 mm into a column, can be used as a fixed bed or a fluid bed. If particle diameter is less than 0.3 mm, the loss of pressure becomes too great in a fixed bed. Similarly, if the particle diameter is less than 0.3 mm, there is a danger that the carrier will be destroyed and become mixed in with the processed water in a fluid bed. The direction of water flow may be either upward or downward. However, since nitrogen gas is generated in the reactions of the present invention, upward flow is preferred.

In the method of the present invention, the rate of water flow can be chosen so that it is appropriate for the contact method or the amount of metal peroxide held by the carrier. Typically, it is preferable to have an SV of between about 0.1 $h^{-1}$ and about 60 $h^{-1}$. SV refers to space velocity, and is the ratio of the flow rate of the inflow to the volume of the treating device. For example, if the inflow has a flow rate of 2 liter/hr, and the volume of the treating device is one liter, the SV is 2 $h^{-1}$. It is even more preferable to have an SV of between 0.5 $h^{-1}$ and 10 $h^{-1}$. Even more preferable is an SV of between 1 $h^{-1}$ and about 10 $h^{-1}$. The contact between the waste water containing nitrogen compounds and hypochlorite ions and the metal peroxide catalyst is typically conducted at a normal temperature between about 20 and 30° C. If the reaction is conducted at a temperature between about 40 and 80° C., the reaction rate becomes higher, and the contact time can be shortened. Generally, if the nitrogen compound concentration in the water is high, it is preferable to have an extended contact time. Furthermore, if the contact time is too short, there is a danger that hypochlorite ions will remain in the processed water.

By the present invention, oxidative breakdown of nitrogen compounds in water which contains nitrogen compounds is possible without the need for added oxidants, such as chlorine oxidants or hydrogen peroxide. Furthermore, the reaction can be performed at standard temperature and pressure. Because the reaction proceeds rapidly under normal temperature and pressure, the reaction device can be made more compact, and it is possible to obtain a processed water of a stable quality.

Referring to FIG. 1, there is shown a process flow chart of one embodiment of the present invention. Waste water which contains nitrogen compounds is brought to a storage container 1. Inorganic chlorides are added as needed with mixing. Waste water is sent to an electrolysis reaction container 3 by a pump 2. After electrolysis, the waste water is circulated back to storage container 1. The waste water, which now contains nitrogen compounds and hypochlorite ions generated by electrolysis, is then removed from storage container 1 by pump 4 and is sent to reaction column 5 which is packed with a metal peroxide catalyst. Processed water is obtained by treating the waste water with the metal peroxide catalyst at normal temperature and pressure.

By the present invention, it is possible to remove nitrogen compounds at a high rate with a small device, without adding oxidants such as chlorine oxidants or hydrogen peroxide. In particular, with the present invention, no hypochlorite ions remain in the processed water because the metal peroxide catalyst is able to break down hypochlorite ions. Therefore, there is no need for a separate residual chlorine removal process, as in the prior art. Furthermore, with the present invention, the hypochlorite ions which are generated are more likely to react with nitrogen compounds than with metal peroxide catalysts, and so the ions will not be unnecessarily broken down.

With the present invention, inorganic nitrogen compounds or organic nitrogen compounds are broken down to harmless nitrogen gas, carbon dioxide gas, water, and the like. It is possible to reduce total nitrogen concentration and the chemical oxygen demand of the processed water. The method of the present invention can be applied to waste water which contains one of either inorganic nitrogen compounds or organic nitrogen compounds, or it can be applied to waste water which contains both.

Embodiment 1

Treatment of waste water which contained 1,000 mg/liter of monoethanolamine, 375 mg/liter of ammonia nitrogen, and 8,000 mg/liter of sodium chloride was conducted. The initial water quality of this waste water was as follows: total nitrogen (T-N)=605 mg/liter, ammonia nitrogen ($NH_4^+$—N)=375 mg/liter, total organic carbon (TOC)=393 mg/liter, chemical oxygen demand by potassium permanganate at 100° C. ($COD_{Mn}$)=839 mg/liter, residual chlorine=0 mg/liter, and pH=9.3.

1,250 ml of this waste water was placed in an electrolysis container. The electrolysis container had 5.0 cm×5.0 cm platinum-plated titanium plate electrodes. The waste water was processed by passage through a circulating system. The distance between the electrodes was 1.0 cm. The between-electrode volume of the reaction container between the electrodes was 25.0 cm³. Current was 2.5 A, and current density was 10 A/dm². The circulating solution passage rate was 110 ml/min.

The circulating reaction processing was conducted for six hours. The water quality after six hours was the following: total nitrogen (T-N)=68 mg/liter, ammonia nitrogen ($NH_4^+$—N)=1 mg/liter, total organic carbon (TOC)=72 mg/liter, oxygen demand ($COD_{Mn}$)=124 mg/liter, residual chlorine=751 mg/liter, and pH 6.8.

Referring to Table 1, the water quality analysis after each hour of circulating reaction time is shown.

TABLE 1

| Processing time (hr) | Stored circulating water (Comparison 1) | | | | | | Outflow from catalyst reaction column (Embodiment 1) | | | | | |
|---|---|---|---|---|---|---|---|---|---|---|---|---|
| | T-N mg/l | $NH_4^+$-N mg/l | TOC mg/l | $COD_{Mn}$ mg/l | Residual $Cl^-$ mg/l | pH | T-N mg/l | $NH_4^+$-N mg/l | TOC mg/l | $COD_{Mn}$ mg/l | Residual $Cl^-$ mg/l | pH |
| 0 | 605 | 375 | 393 | 839 | 0 | 9.3 | — | — | — | — | — | — |
| 1 | 502 | 292 | 359 | 767 | 16 | 8.8 | — | — | — | — | — | — |
| 2 | 426 | 227 | 340 | 635 | 19 | 8.3 | — | — | — | — | — | — |
| 3 | 297 | 107 | 316 | 591 | 204 | 5.2 | — | — | — | — | — | — |
| 4 | 164 | 41 | 198 | 371 | 384 | 2.3 | — | — | — | — | — | — |
| 5 | 96 | 17 | 18 | 221 | 672 | 3.9 | — | — | — | — | — | — |
| 6 | 68 | 1 | 72 | 124 | 751 | 6.8 | — | — | — | — | — | — |
| 7 | 61 | ND | 53 | 92 | 863 | 6.9 | 48 | ND | 4.8 | 2.6 | ND | 7.4 |
| 8 | 57 | ND | 2 | 19 | 949 | 7.2 | 46 | ND | 2.7 | 1.7 | ND | 7.6 |
| 9 | 57 | ND | 9.0 | 12 | 954 | 7.3 | 45 | ND | 2.1 | 1.6 | ND | 7.6 |
| 10 | 57 | ND | 3.4 | 3.6 | 963 | 7.3 | 45 | ND | 1.5 | 1.6 | ND | 7.6 |

N.D. = not detected

After six hours, the electrolysis reaction was stopped. The solution in the electrolysis storage container was processed at a speed of 150 ml/hour through a reaction column packed with cobalt peroxide-carrying catalyst. The catalyst was a cobalt peroxide at 2.5% by weight of cobalt in a spherical titania carrier having a diameter of 1.5 mm. The packing volume of the catalyst was 50 ml. The reaction column was processed at room temperature. Solution passage was continued for four hours. After each hour, the entire amount of processed water was collected, and the water quality was analyzed. The processing time was added to the electrolysis processing time (six hours). Referring to Table 1, there is shown the water quality between seven and ten hours of processing.

Between seven and ten hours of processing, total nitrogen (T-N) was at or below 50 mg/liter; ammonia nitrogen ($NH_4^+$—N) was not detected; total organic carbon (TOC) was at or below 5.0 mg/liter; oxygen demand ($COD_{Mn}$) was at or below 3.0 mg/liter; and residual chlorine was not detected.

Comparison 1

Under the same conditions as Embodiment 1, electrolysis was conducted for ten hours continuously in a separate circulating processing system. After every hour, the water quality of the water in the electrolysis storage container was analyzed. The results are shown in Table 1.

Up to six hours, the results of water quality analysis were the same as Embodiment 1. After eight hours, there were no changes in total nitrogen (T-N) (57 mg/liter). After seven hours, ammonia nitrogen ($NH_4^+$—N) was not detected. Total organic carbon (TOC) was below 5 mg/liter, and ten hours of electrolysis were required for the water quality to have an oxygen demand ($COD_{Mn}$) of below 5 mg/liter. From the seventh hour on there was a trend of increasing residual chlorine.

It can be seen that treatment of water by contact with cobalt peroxide catalyst produces a processed water of superior quality to that obtained by electrolysis alone over many hours.

Embodiment 2

Processing of waste water which contained 1,000 mg/liter of 1,3-dimethyl-2-imidazolidinone was conducted. The initial water quality of this waste water was the following: total nitrogen (T-N)=246 mg/liter, total organic carbon (TOC)-526 mg/liter, chemical oxygen demand by potassium permanganate at 100° C.($COD_{Mn}$)=950 mg/liter, residual chlorine=0 mg/liter, sodium chloride=10,000 mg/liter, and pH 9.7.

500 ml of the waste water was placed in the electrolysis container. Under the same conditions as Embodiment 1, electrolysis was conducted for three hours. After each hour, the water quality of the water in the electrolysis storage container was measured. Referring to Table 2, the results are shown.

TABLE 2

| Processing time (hr) | Stored circulating water (Comparison 2) | | | | | Outflow from catalyst reaction column (Embodiment 2) | | | | |
|---|---|---|---|---|---|---|---|---|---|---|
| | T-N mg/l | TOC mg/l | $COD_{Mn}$ mg/l | Residual $Cl^-$ mg/l | pH | T-N mg/l | TOC mg/l | $COD_{MN}$ mg/l | Residual $Cl^-$ mg/l | pH |
| 0 | 246 | 526 | 950 | 0 | 9.7 | — | — | — | — | — |
| 1 | 183 | 400 | 718 | 108 | 9.2 | — | — | — | — | — |
| 2 | 100 | 165 | 308 | 540 | 7.9 | — | — | — | — | — |
| 3 | 53.3 | 70 | 130 | 864 | 8.3 | — | — | — | — | — |
| 4 | 43.3 | 39 | 72 | 1150 | 8.5 | 28.1 | 5.7 | 9.4 | N.D. | 8.7 |
| 5 | 40.0 | 23 | 49 | 1490 | 8.9 | 26.3 | 4.2 | 6.7 | N.D. | 9.1 |

N.D. = not detected

Electrolysis was halted after three hours. As in Embodiment 1, water from the electrolysis container was then passed at a rate of 150 ml/hour through a reaction column packed with cobalt peroxide catalyst. Solution passage was continued for two hours. After each hour, the entire amount of water was collected, and water quality analysis was conducted. The processing time was added to the electrolysis time (three hours). Referring to Table 2, the water quality for hours 4 and 5 are shown.

The water quality after three hours of electrolysis processing was as follows: total nitrogen (T-N)=53.3 mg/liter, total organic carbon (TOC)=70 mg/liter, oxygen demand ($COD_{Mn}$)=130 mg/liter, residual chlorine=864 mg/liter. The water quality after passage through the cobalt peroxide catalyst reaction column was as follows: total nitrogen (T-N) less than 30 mg/liter, total organic carbon (TOC) less than 10 mg/liter, oxygen demand ($COD_{Mn}$) less than 10 mg/liter, and residual chlorine was not detected. Ammonia nitrogen ($NH_4^+$—N) was not measured.

Comparison 2

Electrolysis with a separate circulating processing system was conducted continuously for five hours under the same conditions as embodiment 2. The water quality analysis results up to the third hour were the same as in embodiment 2. The water quality for the fourth and fifth hours is shown in Table 2.

Compared with passage through the catalyst reaction column of the present invention, total nitrogen (T-N) total organic carbon (TOC), and oxygen demand ($COD_{Mn}$) values all were higher. In particular, residual chlorine at five hours was very high (1,490 mg/liter). The residual chlorine increased as the 1,3-dimethyl-2-imidazolidinone was broken down.

Embodiment 3

Processing of waste water containing 5,000 mg/liter of urea and 6,000 mg/liter of sodium chloride was conducted. The water quality of the waste water was as follows: total nitrogen (T-N)=2,330 mg/liter, ammonia nitrogen ($NH_4^+$—N)=5.5 mg/liter, total organic carbon (TOC)=1,000 mg/liter, residual chlorine=0 mg/liter, and pH 11.9.

1,000 ml of this waste water was placed in an electrolysis container. Electrolysis was conducted for four hours under the same conditions as Embodiment 1. After four hours, electrolysis was terminated. As in Embodiment 1, the water in the electrolysis storage container was passaged at a rate of 150 ml/hour through a reaction column packed with cobalt peroxide holding catalyst. Passage was continued for four hours. After each hour, the entire volume of the processing water was collected, and water quality was analyzed. Processing time was added to the electrolysis time (four hours). Referring to Table 3, the water quality between five and eight hours of processing are shown.

TABLE 3

| Processing time (hr) | Stored circulating water (Comparison 3) | | | | | Outflow from catalyst reaction column (Embodiment 3) | | | | |
|---|---|---|---|---|---|---|---|---|---|---|
| | T-N mg/l | $NH_4^+$-N mg/l | TOC mg/l | Residual Cl⁻ mg/l | pH | T-N mg/l | $NH_4^+$-N mg/l | TOC mg/l | Residual Cl⁻ mg/l | pH |
| 0 | 2330 | 5.5 | 1000 | 0 | 11.9 | — | — | — | — | — |
| 1 | — | — | — | — | 6.4 | — | — | — | — | — |
| 2 | 1260 | 26.8 | 554 | 668 | 6.3 | — | — | — | — | — |
| 3 | — | — | — | — | 6.6 | — | — | — | — | — |
| 4 | 460 | 9.0 | 163 | 1790 | 6.4 | — | — | — | — | — |
| 5 | — | — | — | — | — | 123 | 12.0 | 23 | 18 | 8.7 |
| 6 | 137 | N.D. | 1.5 | 2520 | 9.1 | 107 | N.D. | 1.1 | 7.2 | 9.3 |
| 7 | — | — | — | — | — | 101 | N.D. | 0.9 | N.D. | 9.5 |
| 8 | 143 | N.D. | 1.4 | 2590 | 9.3 | 98 | N.D. | 0.5 | N.D. | 9.6 |

N.D. = not detected

The water quality after four hours of electrolysis was as follows: total nitrogen (T-N)=460 mg/liter, total organic carbon (TOC)=163 mg/liter, residual chlorine=1,790 mg/liter. The water quality of the water samples passaged through the cobalt peroxide holding catalyst between five and eight hours were as follows: total nitrogen (T-N)= between 123–98 mg/liter, and total organic carbon (TOC)= between 23–0.5 mg/liter. Residual chlorine after five hours of processing was 18 mg/liter, and after seven hours of processing, residual chlorine was not detectable.

Comparison 3

Electrolysis was conducted continuously for eight hours by a separate circulating processing system under the same conditions as in Embodiment 3. Referring to Table 3, the water quality analysis results for hours 6 and 8 are shown. Total nitrogen (T-N) values were much higher, compared with passage through the catalyst reaction column of the present invention. Furthermore, residual chlorine values were very high (2,520–2,590 mg/liter).

The method of the present invention is effective against various nitrogen compounds. The present invention does not require additional oxidants, and can easily process waste water containing nitrogen compounds at normal temperature and pressure. With the present invention, it is possible to obtain high quality processed water which is low in total nitrogen concentration, total organic carbon concentration, and chemical oxygen demand. Furthermore, hypochlorite ions are broken down by metal peroxide catalysts and do not remain in the processed water. The water quality of the processed water is thereby further improved. Furthermore, the setup for embodiments of the present invention is compact. Because the necessary space for setup is reduced, the maintenance is easy.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for treating waste water containing nitrogen compounds and chlorine ions, comprising the steps of:
adding additional chlorine ions to said waste water to a predetermined concentration which is a substoichiometric amount relative to the amount required to oxidize said nitrogen compounds;
performing electrolysis on said waste water, such that said chlorine ions are oxidized to hypochlorite ions;
transferring said waste water to a storage container where said nitrogen compounds are oxidized by said hypochlorite ions and thereby broken down and said chloride ions are regenerated; and
contacting said waste water from said storage container with a metal peroxide catalyst, such that residual hypochlorite ions are removed from said waste water.

2. A method for treating waste water according to claim 1, further comprising circulating said waste water between a storage container and an electrolysis chamber before said step of contacting said waste water with a metal peroxide catalyst.

3. A method for treating waste water according to claim 1, further comprising adding at least one inorganic chloride to said waste water.

4. A method for treating waste water according to claim 1, wherein said step of performing electrolysis includes contacting said waste water with at least two electrodes made from a substantially water-insoluble material.

5. A method for treating waste water according to claim 4, wherein said electrodes are a member selected from the group consisting of platinum-plated titanium electrodes, iridium-coated titanium electrodes, palladium-coated titanium electrodes, lead dioxide electrodes, and ferrite electrodes.

6. A method for treating waste water according to claim 3, wherein said at least one inorganic chloride includes at least one member selected from the group consisting of lithium chloride, sodium chloride, potassium chloride, beryllium chloride, magnesium chloride, and calcium chloride.

7. A method for treating waste water according to claim 1, wherein a metal peroxide in said metal peroxide catalyst is at least one member selected from the group consisting of cobalt peroxide, nickel peroxide, copper peroxide, and silver peroxide.

8. A method for treating waste water according to claim 7, wherein said metal peroxide catalyst includes a carrier, said carrier being a member selected from the group consisting of zeolite, titania, γ-alumina, and α-alumina.

9. A method for treating waste water according to claim 8, wherein said metal peroxide is between about 0.01% and about 10% by weight of said carrier.

10. A method for treating waste water according to claim 1, wherein said metal peroxide catalyst includes catalyst particles, said catalyst particles having a diameter between about 0.3 mm to about 10 mm.

11. A method for treating waste water according to claim 10, wherein said catalyst particles are arranged in a column in one of a fixed bed and a fluid bed.

12. A method for treating waste water according to claim 1, further comprising flowing said waste water over said metal peroxide catalyst at a flow rate such that said method has an SV of between about $0.1\ h^{-1}$ and $60\ h^{-1}$.

13. A method for treating waste water according to claim 1, wherein said process is performed at a temperature between about 20° C. and about 80° C., and at a pressure that is substantially equal to atmospheric pressure.

14. A method for treating waste water containing at least one of organic nitrogen and nitrogen compounds, comprising the steps of:
circulating said waste water between a storage container and an electrolysis container;
adding inorganic chlorides to said storage container in a substoichiometric quantity relative to the amount required to oxidize said at least one of organic nitrogen and nitrogen compounds;
performing electrolysis in said electrolysis chamber, to oxidize chlorine ions to hypochlorite ions, and to oxidize said nitrogen compounds with said hypochlorite ions whereby said at least one of organic and nitrogen compounds are broken down; and
contacting said waste water with a metal peroxide catalyst after said step of performing electrolysis, whereby said hypochlorite ions formed during said electrolysis are removed from said waste water;
said metal peroxide catalyst containing one of cobalt peroxide and nickel peroxide;
said metal peroxide catalyst further containing at least one member from the group consisting of zeolite, titania, γ-alumina, and α-alumina;
said one of cobalt peroxide and nickel peroxide being present in said metal peroxide catalyst at a concentration of between about 0.01% by weight and 10% by weight;
said step of contacting occurring at an SV between about $0.1\ hr^{-1}$ and about $60\ hr^{-1}$, a temperature between about 20° C. and about 80° C., and a pressure substantially equal to atmospheric pressure.

* * * * *